(No Model.)

A. HUNTER.
ELASTIC TIRE.

No. 496,361. Patented Apr. 25, 1893.

Witnesses
Geo. W. Toury.
John E. Wiles.

Inventor
Andrew Hunter
By H.G. Underwood
Attorney

UNITED STATES PATENT OFFICE.

ANDREW HUNTER, OF CHICAGO, ILLINOIS, ASSIGNOR OF ONE-HALF TO JOHN W. WARD, OF POSTVILLE, IOWA.

ELASTIC TIRE.

SPECIFICATION forming part of Letters Patent No. 496,361, dated April 25, 1893.

Application filed October 8, 1891. Serial No. 408,116. (No model.)

*To all whom it may concern:*

Be it known that I, ANDREW HUNTER, a citizen of the United States, and a resident of Chicago, in the county of Cook, and in the State of Illinois, have invented certain new and useful Improvements in Elastic Tires; and I do hereby declare that the following is a full, clear, and exact description thereof.

My invention relates to certain new and useful improvements in elastic or cushioned tires for vehicle wheels, and consists in the matters hereinafter described and more particularly pointed out in the appended claims.

Figure 1:
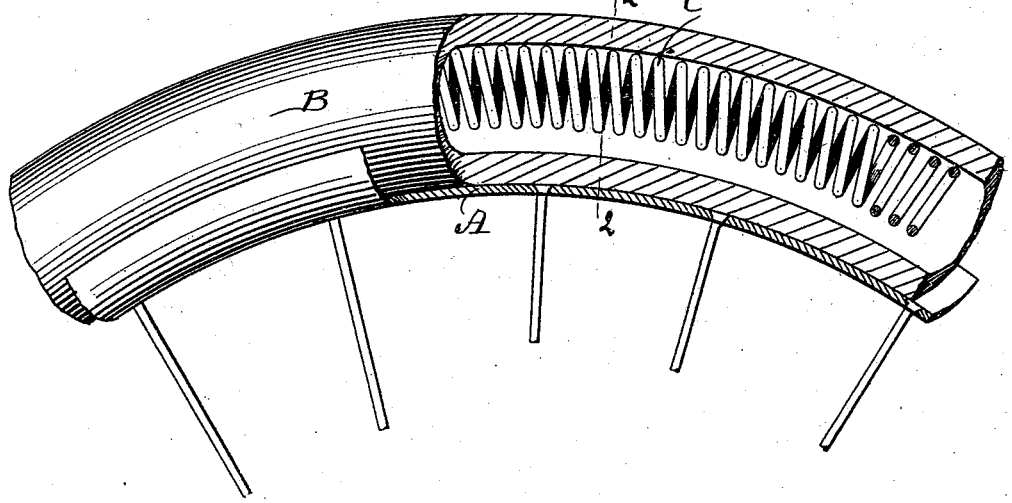
Figure 2:
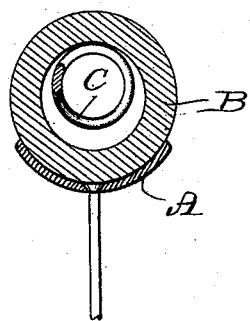

In the accompanying drawings illustrating my invention:—Figure 1, is a side elevation, partly in section, of a device embodying my invention. Fig. 2, is a cross section of the same taken on line 2—2 of Fig. 1.

In said drawings:—A represents the rim of a bicycle or other vehicle wheel, B a tubular tire located around the outer periphery of said rim. This tubular tire is preferably formed from a tube of rubber or analogous material having walls of a uniform thickness throughout. A spirally coiled spring C, is located within the opening in the tire B, and is arranged to bear outwardly against the inner surface of the outer wall of said tubular tire. This spirally coiled spring is preferably made of a less diameter in cross section than the bore of the tubular tire so as to leave a small space between the said spring and the inner wall of the tubular tire as shown. I also prefer to make the spirally coiled spring C, of a sufficient length to form a circle of considerably larger diameter than that of the tire, when its ends are brought together, and to compress said spring lengthwise so as to lessen the diameter of said circle and permit said spring to lie within the tubular tire.

I find it convenient to form my improved tire by first passing the spirally coiled spring through a piece of the elastic tubing of the requisite length to form the tire, said spring being of somewhat greater length than said tube, then joining the ends of said spring, and then joining the ends of the tube. It will be seen that the spring having been originally made longer than the tube, will, when the ends of said tube are brought together, be compressed lengthwise, and its expansive force will serve to press it outwardly against the inner surface of the outer wall of said tube. It will be seen that by this construction, the tire is adapted to yield inwardly when rough or uneven places are encountered until the spirally coiled spring comes into contact with the opposite or inner wall of said tube, said spring being permitted to yield lengthwise as well as inwardly. The outward pressure of the spring against the outer wall of the tubular tire, will ordinarily be sufficient to prevent said spring from coming into contact with the inner wall of the tube, while permitting the tire to yield very readily.

By my improvement, I am enabled to construct a tire from elastic tubing such as is regularly for sale upon the market and spirally coiled springs that may be bought ready made from dealers, thereby greatly reducing the cost of manufacturing my improved tire and reducing the labor necessary to produce the completed article, to a minimum.

By my improved construction, I am enabled to manufacture a tire which possesses much greater elasticity than the ordinary forms of cushion tires.

Having thus described my invention, what I claim is—

1. A tire for vehicle wheels comprising a tube of elastic material, and a continuous spirally coiled spring of a less diameter in cross section than the bore or opening of the tube and extending throughout the length of the tube, said spirally coiled spring being arranged to bear outwardly against the outer wall of the tube and to leave a continuous open space adjacent to the inner wall of said tube, substantially as described.

2. A tire for vehicle wheels comprising a tube of elastic material and a spring extending continuously throughout the bore or opening of said tube and arranged to bear outwardly against the outer wall of the tube, but so as to leave a continuous open space between said spring and the inner wall of the tube substantially as described.

In testimony that I claim the foregoing I have hereunto set my hand, at Milwaukee, in the county of Milwaukee and State of Wisconsin, in the presence of two witnesses.

ANDREW HUNTER.

Witnesses:
JOHN E. WILES,
N. E. OLIPHANT.